(12) United States Patent  
Burch

(10) Patent No.: US 6,295,387 B1  
(45) Date of Patent: Sep. 25, 2001

(54) METHOD AND APPARATUS FOR DETERMINATION OF VERIFIED DATA

(75) Inventor: Eric L. Burch, Rockville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/321,199

(22) Filed: May 27, 1999

(51) Int. Cl.$^7$ .................................................. G06K 9/03
(52) U.S. Cl. .............................................................. 382/311
(58) Field of Search .................................... 382/311, 319, 382/220, 170, 171, 172, 173, 179, 224, 222, 227, 246, 289, 297; 707/6, 8

(56) References Cited

U.S. PATENT DOCUMENTS

| | | |
|---|---|---|
| 4,032,887 | 6/1977 | Roberts . |
| 5,257,328 | 10/1993 | Shimizu . |
| 5,271,067 | 12/1993 | Abe et al. . |
| 5,282,267 | 1/1994 | Woo, Jr. et al. . |
| 5,455,875 | 10/1995 | Chevion et al. . |
| 5,519,786 * | 5/1996 | Courtney et al. ............... 382/159 |
| 5,696,854 | 12/1997 | Shepard . |
| 5,697,504 | 12/1997 | Hiramatsu et al. . |
| 6,125,362 * | 9/2000 | Elworthy .............................. 707/6 |
| 6,151,423 * | 11/2000 | Melen ................................. 382/289 |

* cited by examiner

Primary Examiner—Andrew W. Johns
Assistant Examiner—Seyed Azarian

(74) Attorney, Agent, or Firm—Andrew C. Aitken; Venable, Baetjer, Howard & Civiletti LLP

(57) ABSTRACT

A method and apparatus for determining the veracity of data. The method includes at least one comparison of manually input data and data generated by an automated process. The data generated by the automated process is typically the result of optical character recognition (OCR) and includes the generation of both classification of the optically read data as well as confidences for the data. For each piece of data processed by the OCR, the OCR program will generate a classification, which is a guess by the OCR program as to what that piece of data is, and a confidence level, which is the OCR's evaluation of how good the classification guess was. Depending on whether it is desired to check the accuracy of the manually input data or the results of the optical character recognition determines how the data is compared. The low confidence data is typically re-keyed into the system manually. To perform quality assurance on the manually input data, one compares the results of the optical character recognition with the manually input data. If they match, the manually input data is determined to be accurate and passes a quality assurance test. If they do not match, a second operator inputs additional data manually. This will be compared to the first set of manually input data, and if these sets of data match, then the first set of manually input data is determined to be accurate, thus passing the quality assurance test. If these data sets do not match, then the results of the optical character recognition are compared to the second set of manually input data. If these two sets of data match, then it is determined that the first set of manually input data is inaccurate and thus failing the quality assurance test. Similar comparisons are performed to test the veracity of the optical character recognition data.

22 Claims, 4 Drawing Sheets

METHOD AND APPARATUS FOR DETERMINATION OF VERIFIED DATA

This invention was made with Government support under contract 50-YABC-7-66010 awarded by Bureau of the Census. The U.S. Government has certain rights in this invention.

BACKGROUND OF THE INVENTION

1. Field of the Invention

The present invention relates to a method and apparatus for determining the veracity of data which previously required manual input. More particularly, the present invention relates to a method that seeks to determine the veracity of data by comparing data read by an OCR (Optical Character Reader) keyed into a system by an operator.

2. Related Art

Traditionally, optical character recognition has been used to read and process large amounts of data, such as that collected in a census. For each character image read and processed, the OCR program will generate a "classification", which is the guess as to what the character processed is, and a "confidence", which is the OCR's evaluation of how likely the data has been correctly read. It has been normal practice to retype low confidence data. Such re-keying of data is performed by workers at manual keying workstations, where the image is redisplayed for the operator who presses the appropriate character key. Typically low-confidence data has been discarded, but an examination of such low-confidence raw OCR data has proven that many times the OCR will get the classification correct, but at a low confidence level.

The accepted industry method to measure the accuracy of the OCR software is to use known test data and process it through a system or to use a set of "trusted keyers", i.e., those people proven to be reliable and accurate, although not 100%, in the entry of data. This typically requires that the best keyboard operators be designated to re-inputting data rather than performing "real" work. Thus, it is desirable to maximize the speed of processing the incoming data and not waste the time of the best keyboard operators.

U.S. Pat. No. 5,282,267 describes a basic OCR system having an operator correction system. A dictionary is made available to the operator to look up correct data while errors are introduced to provide incorrect data to measure operator efficiency feedback. The described method of quality assurance is different from the present invention. The present invention seeks to overcome the time and cost inefficiencies of the previously known art.

SUMMARY OF THE INVENTION

The present invention to determine the veracity of data includes scanning a document containing characters and images as data into a memory, generating predetermined accuracy statistics for use in determining the accuracy of the data, performing automated recognition of the data to generate data classifications and confidences. This will also involve manually inputting classification data by a first operator for data having a low confidence and randomly selecting data to determine if the classification data is the same as the classification data generated by the performance of automated recognition, then the manually input data is found to be accurate and thus passes a quality assurance test. A similar type of comparison is performed to test the veracity of the scanned data. The method re-uses the low-confidence OCR classification data along with the manually keyed data of questionable accuracy to determine whether both data inputs are correct. When the OCR and manually keyed data disagree, the selected field is sent to a second keyer who inputs the selected data. The results of the two keyers and the OCR data are compared. Two of these three must agree, and the third (whether it is the OCR data or the manually keyed data) will be marked as incorrect. The apparatus used to perform the above method includes a scanner unit to scan the data into the apparatus, an automated recognition unit to generate automated recognition data from the data scanned into the apparatus, a memory unit to store the scanned data and manipulations thereof, and a mathematical processor unit to generate accuracy statistics. There will be at least one manual input station to manually input data to the memory unit, and at least one comparator to compare the automated recognition data with the manually input data.

BRIEF DESCRIPTION OF THE DRAWINGS

The present invention will be better understood, as will the methods of construction and operation as well as economies of scale, by reading the attached detailed disclosure with reference to the accompanying drawings, all of which form a part of this disclosure. In the drawings.

DETAILED DESCRIPTION OF THE PREFERRED EMBODIMENTS

Figure 1A:
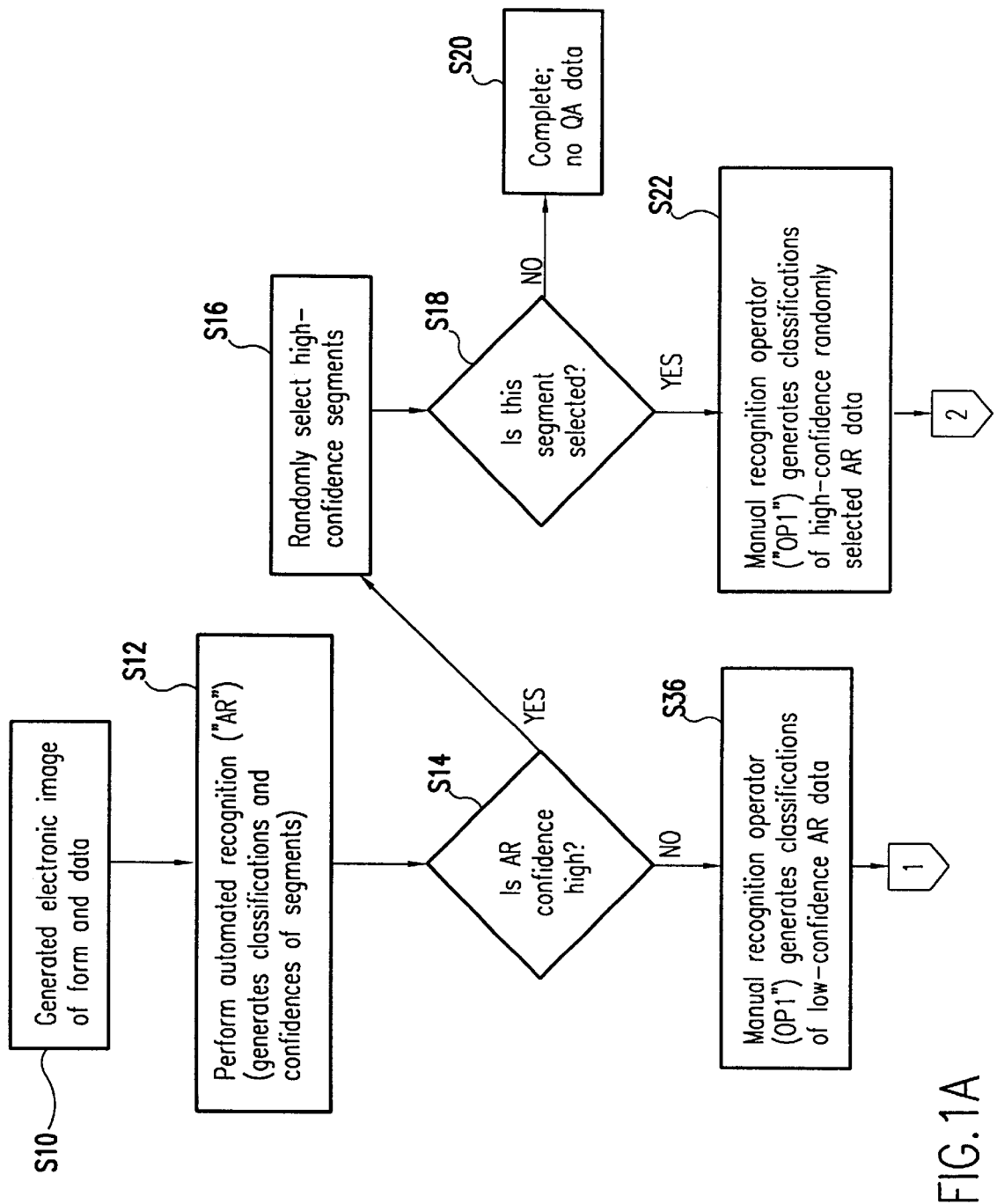
FIGS. 1A–1C illustrate in flow chart form the operation of the present invention.
Figure 1B:
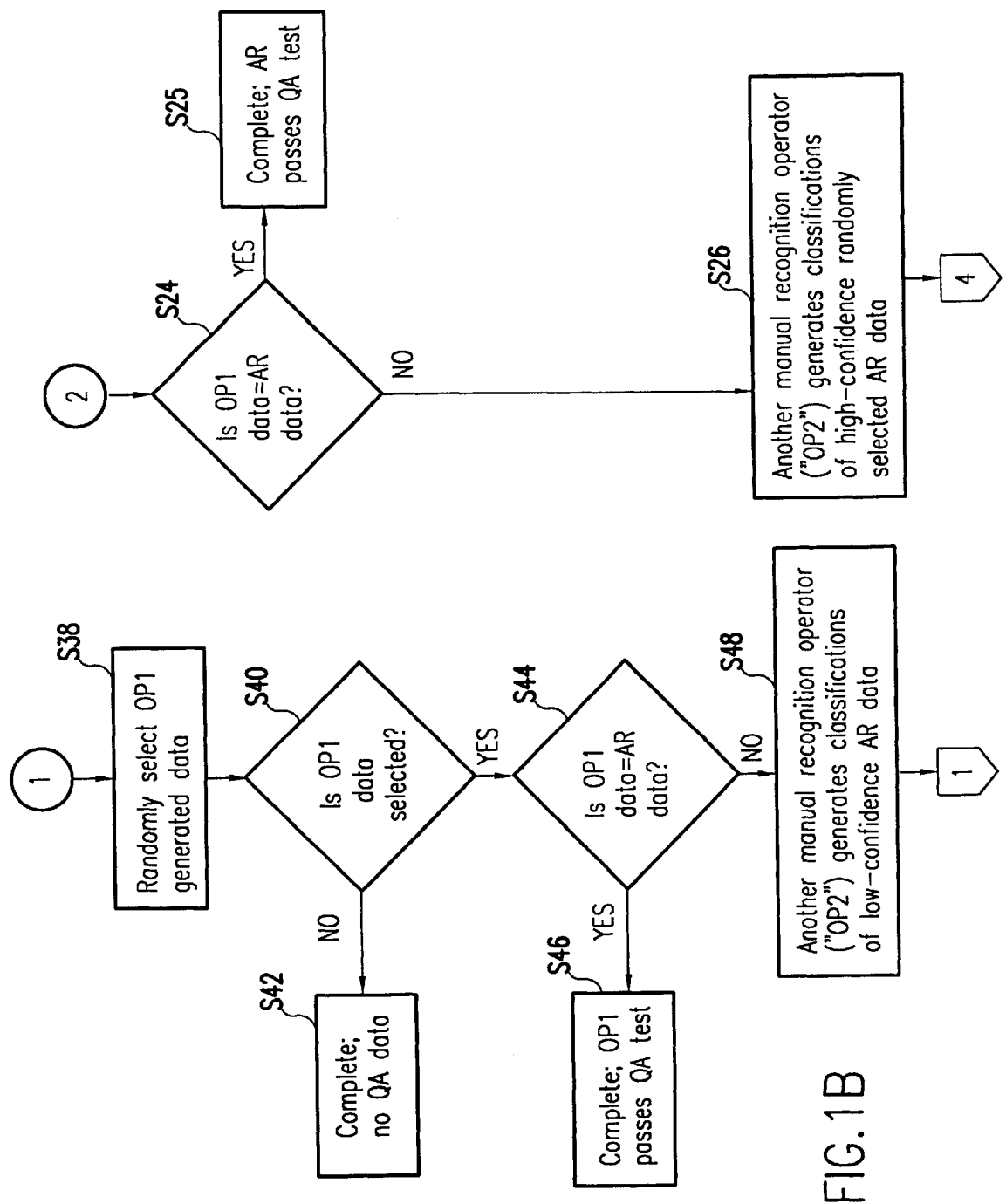
Figure 1C:
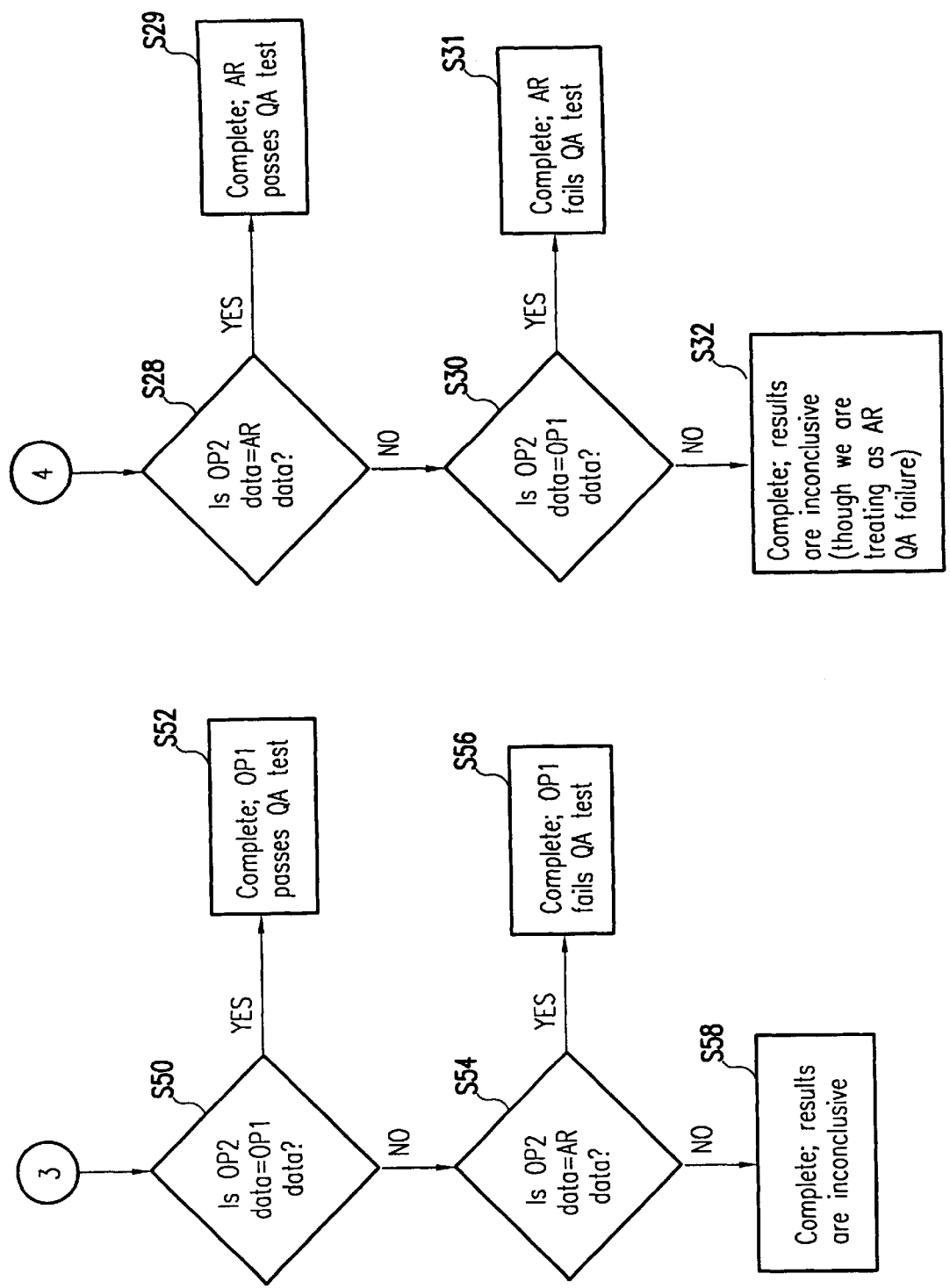
Figure 2:
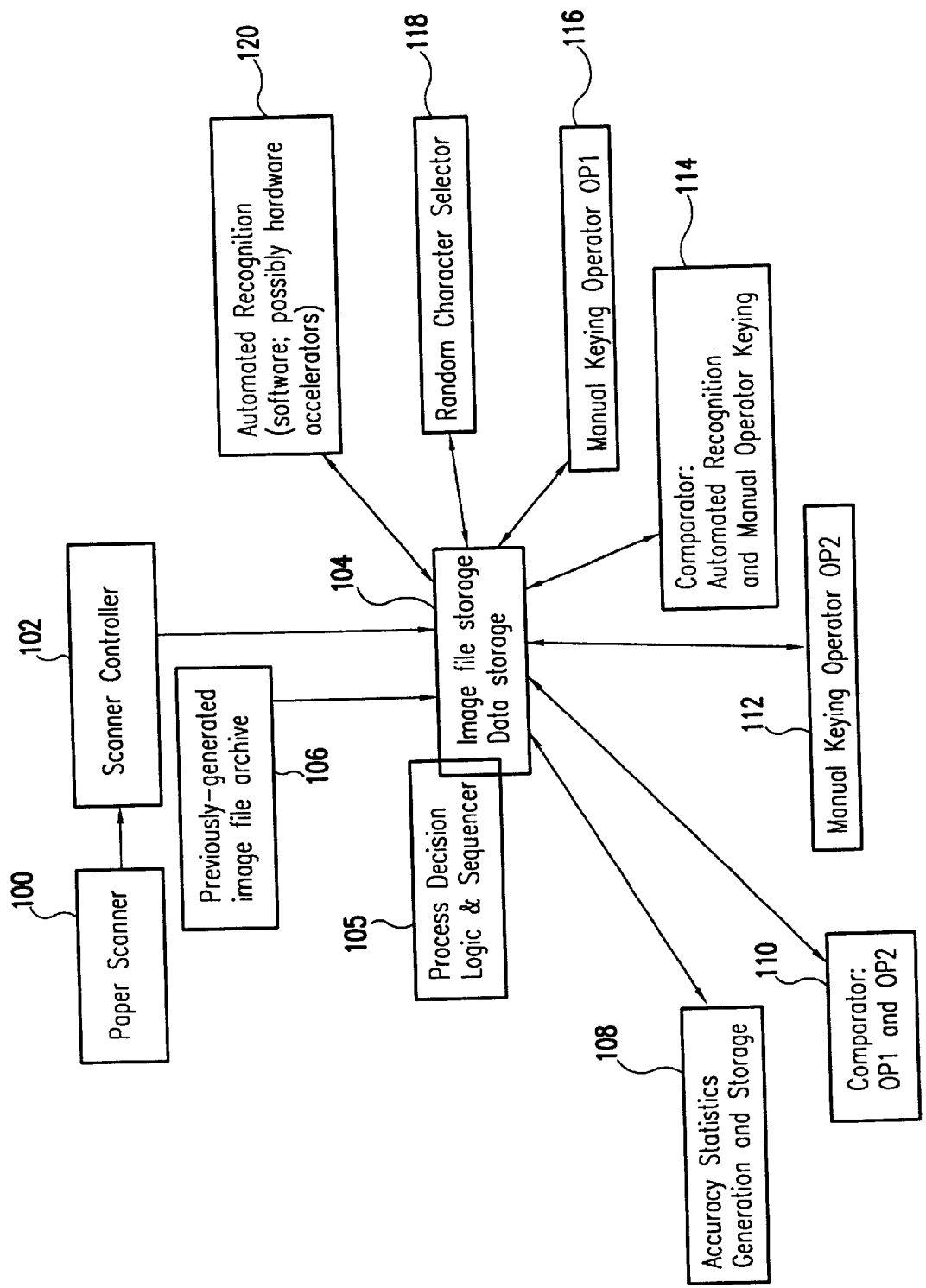
FIG. 2 illustrates the apparatus used to implement the present invention.

FIGS. 1A–1C illustrate the method according to the present invention while FIG. 2 illustrates the apparatus of the present invention. The method will first be described with reference to FIGS. 1A–1C.

FIG. 1A begins the method according to the present invention. In step S10, electronic images of forms and data are generated. Step S12 performs automated recognition ("AR") of the characters. This is when the classifications and confidences are generated for the respective images and forms. Step 12 also separates groups of characters written in respondent input areas into individual characters with each individual character image being called a "segment". In step S14, it is determined whether the AR confidence is high. By high the confidence is above 85%, for example. If the confidence is determined to be high, the process proceeds to step S16 where high confidence segments are selected at random. After the segment is selected in step S16, step S18 checks to ensure that the particular segment was selected. If the particular segment is not selected the process ends in step S20, with no quality assurance ("QA") data generated. However, if the segment is selected in step S18, then the process goes to step S22. In step S22, a manual operator ("OP1") performs manual recognition of the high-confidence data segment and inputs the data corresponding to same. In step S24, a determination is made of whether the data input by OP1 matches the AR data. If the data manually input by OP1 matches the AR data, then the process ends in step S25, with the QA data passing the test.

However, if the determination in step S24 is negative, then an error has occurred either in the manually input data or the data generated by the AR system. Therefore, a second manual operator ("OP2") will generate classifications of the high confidence randomly selected AR data in step S26. In step S28, the OP2 data is compared with the AR data. If the data match one another, the process is completed in step S29, and the AR data passes the QA test. However, if the data do not match in step S28, then the process proceeds to step S30, where the data generated by OP2 is compared with that generated by OP1. If these two data match one another, then the process proceeds to steps S31 where the process finishes, with the AR data failing the QA test. If the data input by OP1 does not match that input by OP2, then the process finishes in step S32, where the results are found to be inconclusive. For operative purposes, this is treated as a QA failure. The AR system should not identify ambiguous characters with high confidence. If AR, OP1 and OP2 disagree, the character segment is probably ambiguous.

If, in step S14, the AR confidence is found not to be high, then the process proceeds to step S36 where OP1 generates classifications for low-confidence AR data. In step S38, data generated by OP1 is randomly selected. Step S40 checks to ensure that OP1 data is selected. If not selected, the process ends in step S42, with no QA data generated for this segment.

If OP1 data is selected, the process moves to step S44 where the manually entered OP1 data is compared with the AR data. If the data match, then the process moves on to step S46 where it is found that OP1 passes the QA test. Known systems would feed known data into the system, rather than comparing the low-confidence AR data. Using some type of statistical analysis, the process can make a QA assessment of the system. If the two sets of data do not match in step S44, then the process moves to step S48, where OP2 is asked to input another manual recognition and generates classification for the low confidence AR data. If the OP2 data matches the OP1 data in step S50, the process finishes in step S52 where OP1 is found to have passed the QA test. If the two sets of data differ, OP2 is then compared with the low confidence AR data is step S54. If these two data sets match, then OP1 is determined to have failed the QA test in step S56. If the two data sets do not match in step S54, then the results are determined to be inconclusive in step S58.

FIG. 2 represents a schematic illustration of the apparatus employed in the present invention. The paper scanner 100 acts as an OCR to scan documents into the system. Scanner 100 is controlled by the scanner controller 102. Scanner controller 102 may be a combination of both hardware and software which communicates with image file storage and data storage 104. The processor, decision and logic circuitry 105 make up the image file storage and data storage 104. Typically, the image file storage and data storage 104 includes a RAM (random access memory). Alternatively, previously scanned but otherwise unprocessed image files may be introduced into the system via archival storage system 106.

Accuracy statistics are generated in the accuracy file generation and storage unit 108. The accuracy statistics generation and storage unit 108 is predominantly software, but does include a memory to store the program used. Comparators 110 and 114 compare OP1 with OP2 and AR data with OP1 and OP2, respectively. It is possible that comparator 114 may be multiple units to compare the AR data with the OP1 and OP2 data individually. The comparators 110 and 114 communicate with the image file storage and data storage unit 104, as do the manual input stations 112 and 116 for OP1 and OP2, respectively. The manual input stations 112 and 116 are keyboards connected to the image file storage and data storage unit 104. Manual input stations 112 and 116 may also be feeders for punch cards. The random character selector 118 selects the random sets of data to be tested. The random character selector 118 is typically written in software. Automated recognition software or hardware accelerator unit 120 also communicates with the image file storage data storage unit 104. Automated recognition includes optical character recognition and optical mark (checkmark) recognition.

The present invention has been described in connection with what are presently considered the most practical and preferred embodiments of the present invention. However, all modifications and equivalent arrangements that fall within the spirit or scope of the appended claims are intended to be included within the instant disclosure.

What is claimed is:

1. A method of determining the veracity of data, comprising:

scanning a document containing characters and images as data into a memory; generating predetermined accuracy statistics for use in determining the accuracy of the data; performing automated recognition of the data so as to generate classifications and confidences for the data;

manually inputting classification data by a first operator for that data having a low confidence;

randomly selecting data from the manually input classification data; and if the classification data randomly selected is the same as the classification data generated by the performance of automated recognition, then the manually input data is found to be accurate and thus passes a quality assurance test.

2. The method according to claim 1, further comprising:

randomly selecting classification data from the classification data of high confidence generated by the automated recognition;

manually inputting classification data for that data of high confidence that was randomly selected; and if the manually input classification data is the same as the classification data generated by the automated recognition, then the automated recognition data is found to be accurate and thus passes a quality assurance test.

3. The method according to claim 2, further comprising:

if the manually input classification data does not match the classification data generated by the automated recognition, manually inputting by a second operator classification data of the randomly selected high confidence classification data generated by the automated recognition; and if the classification data input by the second operator matches the automated recognition classification data, then the automated recognition data is found to be accurate and passes the quality assurance test.

4. The method according to claim 3, further comprising:

if the classification data input by the second operator does not match the automated recognition classification data, then the manually input classification data is compared with that data input by the second operator and if these two sets of data match one another, then the automated recognition classification data fails the quality assurance test.

5. The method according to claim 4, further comprising outputting that the results are inconclusive if the manually input data does not match the data input by the second operator.

6. The method according to claim 1, further comprising:

manually inputting by a second operator classification data corresponding to the low confidence data;

if the classification data input by the second operator matches the classification data input by the first operator, then it is determined that the data input by the first operator is accurate, thus passing the quality assurance test.

7. The method according to claim 6, further comprising:

if the classification data input by the second operator does not match the classification data input by the first operator, then comparing the classification data input by the second operator with the classification data generated by the automated recognition.

8. The method according to claim 7, wherein if the classification data input by the second operator matches the classification data generated by the automated recognition process, then it is determined that the data input by the first operator is not accurate and that data fails the quality assurance test.

9. The method according to claim 7, wherein if the classification data input by the second operator does not match the classification data generated by the automated recognition process, then an inconclusive results signal is output.

10. An apparatus for determining the veracity of data, comprising:

a scanner unit to scan the data into the apparatus;

an automated recognition unit to generate automated recognition data from the data scanned into the apparatus;

a memory unit to store the scanned data and manipulations thereof;

a mathematical processor unit to generate accuracy statistics;

at least one manual input station to manually input data to the memory unit; and at least one comparator to compare the automated recognition data with the manually input data.

11. The apparatus according to claim 10, wherein the apparatus includes two manual input stations.

12. The apparatus according to claim 11, wherein the apparatus includes two comparators, the second comparator being used to compare the data from the second manual input station with the data input from the first manual input station.

13. The apparatus according to claim 10, further comprising a random selection unit to randomly select data from the automated recognition data.

14. An apparatus for testing the veracity of data, comprising:

means for inputting data;

means for generating optical character recognition data corresponding to the input data;

means for generating a statistical analysis to perform on the optical character recognition data;

means for storing data;

means for manually entering data to the storing means; and means for comparing the manually entered data with the optical character recognition data.

15. The apparatus according to claim 14, wherein said inputting means is a scanner.

16. The apparatus according to claim 14, wherein said inputting means is an archive storage system containing previously generated image files.

17. The apparatus according to claim 14, wherein said generating means is software written to optimize the statistical analysis.

18. The apparatus according to claim 14, wherein said storing means includes a RAM.

19. The apparatus according to claim 14, wherein said manually entering means is one of a keyboard and a punch card feeder.

20. The apparatus according to claim 14, wherein said apparatus includes a plurality of said comparing means.

21. The apparatus according to claim 14, wherein said storage means includes a process decision logic and sequencer.

22. A method of testing the veracity of OCR data, comprising:

scanning data into a system;

manually inputting data including a selected set of the scanned data as a first data set by a first operator;

comparing the manually input data with the scanned data;

if the data match one another, determining that the data is accurate;

if the data do not match, having a second operator manually input the selected set of scanned data as a second data set;

comparing the second data set with the first data set and the scanned data; and providing that at least two of the three data sets match one another, determining the veracity of the scanned data and the manually input data sets.

* * * * *